(12) United States Patent
Kim et al.

(10) Patent No.: US 12,118,269 B2
(45) Date of Patent: Oct. 15, 2024

(54) APPARATUS AND METHOD FOR PROVIDING SENSORY EXPERIENCE

(71) Applicants: Hyundai Motor Company, Seoul (KR); Kia Corporation, Seoul (KR)

(72) Inventors: Ki Chang Kim, Suwon (KR); Dong Chul Park, Anyang (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 132 days.

(21) Appl. No.: 17/880,096

(22) Filed: Aug. 3, 2022

(65) Prior Publication Data

US 2023/0185517 A1 Jun. 15, 2023

(30) Foreign Application Priority Data

Dec. 14, 2021 (KR) .......................... 10-2021-0178963

(51) Int. Cl.
| | |
|---|---|
| G06F 3/16 | (2006.01) |
| B60H 3/00 | (2006.01) |
| G01H 17/00 | (2006.01) |
| G06F 3/14 | (2006.01) |
| G10H 1/00 | (2006.01) |
| H05B 47/105 | (2020.01) |

(52) U.S. Cl.
CPC ........... *G06F 3/165* (2013.01); *B60H 3/0007* (2013.01); *G01H 17/00* (2013.01); *G06F 3/14* (2013.01); *G10H 1/0008* (2013.01); *H05B 47/105* (2020.01); *G10H 2210/036* (2013.01)

(58) Field of Classification Search
CPC ......... G06F 3/165; G06F 3/14; H05B 47/105; B60H 3/0007; G01H 17/00; G10H 1/0008; G10H 2210/036
See application file for complete search history.

(56) References Cited

U.S. PATENT DOCUMENTS

| | | | |
|---|---|---|---|
| 10,732,713 B2 | 8/2020 | Min et al. | |
| 11,077,860 B2 | 8/2021 | Shah et al. | |
| 2017/0214962 A1* | 7/2017 | Ono | H04N 21/4131 |
| 2018/0224938 A1 | 8/2018 | Min et al. | |
| 2022/0194410 A1 | 6/2022 | Kim et al. | |
| 2023/0311732 A1* | 10/2023 | Tanabe | B60N 2/879 297/217.3 |

FOREIGN PATENT DOCUMENTS

| | | |
|---|---|---|
| KR | 10-2006-0071256 A | 6/2006 |
| KR | 10-2011-0038260 A | 4/2011 |
| KR | 10-1305129 B1 | 9/2013 |
| KR | 10-1731190 B1 | 4/2017 |
| KR | 10-1744716 B1 | 6/2017 |
| KR | 10-1856935 B1 | 5/2018 |
| KR | 10-2018-0092058 A | 8/2018 |
| KR | 10-2131390 B1 | 7/2020 |
| KR | 10-2021-0047674 A | 4/2021 |
| KR | 10-2022-0089738 A | 6/2022 |

* cited by examiner

*Primary Examiner* — Joseph Saunders, Jr.
(74) *Attorney, Agent, or Firm* — Fox Rothschild LLP

(57) ABSTRACT

Embodiments of the present disclosure relate to a sensory experience providing apparatus for providing a sensory experience based on sound in a vehicle, and a method thereof. The controller is configured to receive a sound played in the vehicle, extract a sound feature from the received sound, generate sensory information based on the extracted sound feature, and provide a sensory experience based on the sensory information.

19 Claims, 7 Drawing Sheets

APPARATUS AND METHOD FOR PROVIDING SENSORY EXPERIENCE

CROSS-REFERENCE TO RELATED APPLICATION

This application is based on and claims the benefit of Korean Patent Application No. 10-2021-0178963, filed in the Korean Intellectual Property Office on Dec. 14, 2021, the entire contents of which are incorporated herein by reference.

TECHNICAL FIELD

Embodiments of the present disclosure relate to a sensory experience providing apparatus for providing a sensory experience based on sound in a vehicle, and a method thereof.

DESCRIPTION OF RELATED ART

Devices with various functions are being applied to vehicles in consideration of a user's convenience, safety, and interest. One of such the devices may be a vibrating seat. The vibrating seat may generate vibrations by controlling a vibration terminal built into a vehicle seat. A conventional vibrating seat may generate vibrations in conjunction with the sound of a sound source being played or may generate vibrations corresponding to dangerous situations when various dangerous situations occur.

Conventionally, a vibrator excitation method applied to a seat and a soft actuator excitation method applied to a steering wheel have been disclosed.

SUMMARY

Embodiments of the present disclosure have been made to solve the above-mentioned problems occurring in the existing technology while advantages achieved by the existing technology are maintained intact.

An embodiment of the present disclosure provides a sensory experience providing apparatus for providing sensory information such as olfactory information and/or visual information based on a sound generated by a vehicle, and a method thereof.

The technical problems to be solved by embodiments of the present disclosure are not limited to the aforementioned problems, and any other technical problems not mentioned herein will be clearly understood from the following description by those skilled in the art to which embodiments of the present disclosure pertain.

According to an embodiment of the present disclosure, a method for providing a sensory experience includes receiving, by a controller, a sound played in a vehicle, extracting, by the controller, a sound feature from the received sound, generating, by the controller, sensory information based on the extracted sound feature, and providing, by the controller, a sensory experience based on the sensory information.

The receiving of the sound includes receiving, by the controller, at least one of an acceleration sound or a cornering sound.

The extracting of the sound feature includes extracting, by the controller, at least one of sound amplitude, a sound frequency, or a sound tone from the received sound.

The generating of the sensory information includes classifying, by the controller, a sound type by analyzing the extracted sound feature and generating, by the controller, at least one of olfactory information or visual information, which matches the classified sound type.

The olfactory information includes at least one of a fragrance type, a fragrance concentration, a fragrance diffusion location, a fragrance diffusion pattern, or a fragrance diffusion time.

The olfactory information further includes at least one of an oxygen supply location, an oxygen supply amount, or an oxygen supply pattern.

The visual information includes at least one of a visual information type, a lighting color, lighting brightness, alighting pattern, an image type, or a color change order according to a vehicle speed.

The providing of the sensory experience includes adjusting, by the controller, an oxygen supply of an oxygen generator based on the sensory information and adjusting, by the controller, fragrance diffusion of a fragrance generator based on the sensory information.

The providing of the sensory experience includes controlling, by the controller, an operation of a lighting based on the sensory information and outputting, by the controller, an output of a display based on the sensory information.

According to an embodiment of the present disclosure, a sensory experience providing apparatus includes a controller mounted in a vehicle. The controller is configured to receive a sound played in the vehicle, extracts a sound feature from the received sound, generates sensory information based on the extracted sound feature, and provides a sensory experience based on the sensory information.

The sound is at least one of an acceleration sound or a cornering sound.

The sound feature includes at least one of sound amplitude, a sound frequency, or a sound tone.

The controller is configured to classify a sound type by analyzing the extracted sound feature and generates at least one of olfactory information or visual information, which matches the classified sound type.

The olfactory information includes at least one of a fragrance type, a fragrance concentration, a fragrance diffusion location, a fragrance diffusion pattern, or a fragrance diffusion time.

The olfactory information includes at least one of an oxygen supply location, an oxygen supply amount, or an oxygen supply pattern.

The visual information includes at least one of a visual information type, a lighting color, lighting brightness, alighting pattern, an image type, and a color change order according to a vehicle speed.

The sensory experience providing apparatus further includes an oxygen generator configured to supply oxygen or a fragrance generator configured to supply a fragrance.

The controller is configured to adjust an oxygen supply of the oxygen generator based on the sensory information and adjusts fragrance diffusion of the fragrance generator based on the sensory information.

The sensory experience providing apparatus further includes lighting and a display. The controller is configured to control an operation of the lighting based on the sensory information and controls an output of the display based on the sensory information.

The controller is configured to separate the received sound into a music sound and a virtual sound, determines a sound source style of the music sound, compares and analyzes a volume of the music sound with a volume of the virtual sound, and generates the sensory information based on the sound source style and the volume comparison result.

As discussed, the method and apparatus suitably include use of a controller or processer.

In another aspect, vehicles are provided that comprise an apparatus as disclosed herein.

BRIEF DESCRIPTION OF THE DRAWINGS

The above and other objects, features and advantages of embodiments of the present disclosure will be more apparent from the following detailed description taken in conjunction with the accompanying drawings.

DETAILED DESCRIPTION

Figure 1:
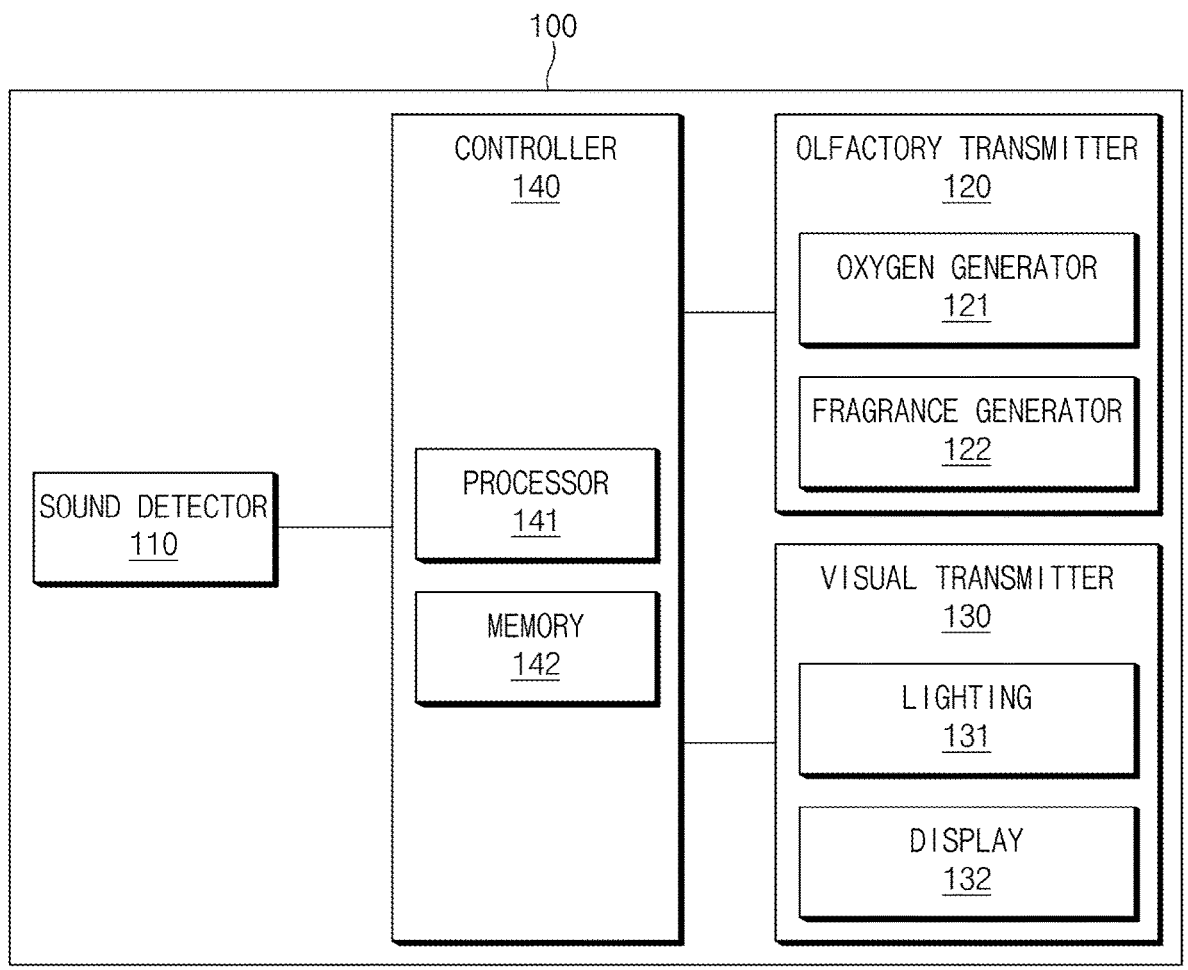
FIG. 1 is a block diagram illustrating a sensory experience providing apparatus, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, and the like, and includes hybrid vehicles, electric vehicles, plug-in hybrid electric vehicles. As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation and can be implemented by hardware components or software components and combinations thereof.

Further, the control logic of embodiments of the present disclosure may be embodied as non-transitory computer readable media on a computer readable medium containing executable program instructions executed by a processor, controller, or the like. Examples of computer readable media include, but are not limited to, ROM, RAM, compact disc (CD)-ROMs, magnetic tapes, floppy disks, flash drives, smart cards, and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the accompanying drawings. In adding reference numerals to components of each drawing, it should be noted that the same components have the same reference numerals, although they are indicated on another drawing. Furthermore, in describing the embodiments of the present disclosure, detailed descriptions associated with well-known functions or configurations will be omitted when they may make subject matters of embodiments of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which embodiments of the present disclosure belong. It will be understood that terms used herein should be interpreted as having a meaning that is consistent with their meaning in the context of embodiments of the present disclosure and the relevant art and will not be interpreted in an idealized or overly formal sense unless expressly so defined herein.

In this specification, a technology is presented to provide a sensory experience (e.g., mood lighting and/or fragrance) based on a sound (e.g., emotional sound and/or virtual sound) generated (played) in a vehicle by using a sensory substitution technology.

FIG. 1 is a block diagram illustrating a sensory experience providing apparatus, according to an exemplary embodiment of the present disclosure.

Referring to FIG. 1, a sensory experience providing apparatus 100 may include a sound detector 110, an olfactory transmitter 120, a visual transmitter 130, and a controller 140.

The sound detector 110 may detect a sound generated in a vehicle. The sound detector 110 may detect an emotional sound played by a media playback device (not shown) and/or a virtual sound (e.g., an acceleration sound, a cornering sound, a driving sound, and the like) played by a sound generating device (not shown). The sound detector 110 may detect a sound output through a speaker (not shown) by using a sound sensor (e.g., a microphone, or the like).

The olfactory transmitter 120 may be a device for providing an olfactory experience and may include an oxygen generator 121 and a fragrance generator 122. The oxygen generator 121 may be mounted in an engine room and/or a trunk of the vehicle. The oxygen generator 121 may be connected to an air conditioning system by a duct. The oxygen generator 121 may supply oxygen to the interior of the vehicle through the air conditioning system. The oxygen generator 121 may adjust an oxygen supply location, an oxygen supply amount, and oxygen supply timing under the control of the controller 140. The fragrance generator 122 may be positioned on a console or the like and may be portable. The fragrance generator 122 may be implemented to have a capsule filling type or a spray type. The fragrance generator 122 may adjust a fragrance type, a fragrance concentration, a fragrance diffusion location, a fragrance diffusion pattern, a fragrance diffusion time depending on control commands of the controller 140.

The visual transmitter 130 may be a device for providing a visual experience and may include a lighting 131 and a display 132. The lighting 131 may be installed as mood lighting at a specific location predetermined in a vehicle or may be installed along a border line of a crush pad. The lighting 131 may be implemented with a light emitting diode (LED) or the like. The lighting 131 may control a lighting color, lighting brightness, and a lighting pattern (turning on or off lighting). The display 132 may display an image. The display 132 may include at least one of a head-up display (HUD), a liquid crystal display (LCD), a thin film transistor-liquid crystal display (TFT-LCD), an organic light-emitting diode (OLED) display, a flexible display, a three-dimensional (3D) display, a transparent display, a touch screen, and a cluster.

The controller 140 may be configured to be electrically connected to the sound detector 110, the olfactory transmitter 120, and the visual transmitter 130. The controller 140 may be configured to include a processor 141 and a memory 142. The processor 141 may control overall operations of the controller 140. The processor 141 may be implemented with at least one of processing devices such as an application specific integrated circuit (ASIC), a digital signal processor (DSP), a programmable logic device (PLD), a field programmable gate array (FPGA), a central processing unit (CPU), a microcontroller and/or a microprocessor. The memory 142 may store a sensory substitution algorithm, a feature extraction algorithm, and various setting information. The memory 142 may be a non-transitory storage medium that stores instructions executed by the processor 141. The memory 142 may be implemented with at least one of storage media such as a flash memory, a hard disk, a solid state disk (SSD), a secure digital (SD) card, a random access memory (RAM), a static random access memory (SRAM), a read only memory (ROM), a programmable read only memory (PROM), an electrically erasable and programmable ROM (EEPROM), an erasable and programmable ROM (EPROM) and/or web storage. The memory 142 may be positioned inside and/or outside the processor 141.

The processor 141 may perform signal conversion for converting the corresponding sound into an electric signal when a sound, for example, an emotional sound and/or a virtual sound is played in the vehicle. The processor 141 may substitute (convert) the sound played in the vehicle into sensory information by using the sensory substitution algorithm. The sensory substitution algorithm may include steps of sensation, perception, and recognition. A sensation step is a process of converting a physical stimulus (e.g., sound) into an electrical signal; a perception step is a process of extracting a meaningful pattern from the electrical signal converted in the sensation step and giving meaning to the meaningful pattern; and a recognition step is a process of expressing emotional meaning by using the five senses. The sensory information may include olfactory information and/or visual information. The olfactory information may include a fragrance type (e.g., floral and aromatic), a fragrance concentration (strength), a fragrance diffusion location, a fragrance diffusion pattern, and/or a fragrance diffusion time. In addition, the olfactory information may include an oxygen supply amount, an oxygen supply location, and an oxygen supply pattern. The visual information may include a visual information type (e.g., display color, mood lighting, and/or images), a color, illuminance (brightness), and/or an image type (e.g., an aurora image and/or a forest image).

The processor 141 may convert sensory information into a sensory signal (e.g., an olfactory signal and/or a visual signal). In other words, the processor 141 may control the olfactory transmitter 120 and/or the visual transmitter 130 based on the sensory information and then may output an olfactory signal (e.g., oxygen, fragrance, and the like) and/or a visual signal (e.g., mood lighting, HUD, and/or crush pad lighting).

For example, when a driver is sleeping soundly or a sound source having a depressing atmosphere is played while the vehicle is stopped, the processor 141 may control the fragrance generator 122 so as to diffuse the scent of *gardenia* having which has a calming effect on nerves.

As another example, when a sound source having a strong beat is played in driving situations, the processor 141 may allow the fragrance generator 122 to diffuse the scent of lavender that helps relieve stress.

As another example, when an acceleration sound or a cornering sound is played in driving situations, the processor 141 may control the fragrance generator 122 to diffuse the scent of lavender depending on predetermined information.

The processor 141 may recognize a sound source by determining the stopped or driving state of the vehicle. Furthermore, when a driving sound is played, the processor 141 may recognize the driving state in connection with a vehicle speed and/or an opening degree of an accelerator pedal.

The processor 141 may generate the visual information based on a vehicle status and sound. The visual information may include a visual information type, turning on/off mood lighting, a lighting color, lighting brightness, an image type, and/or a color change order according to a vehicle speed.

For example, the processor 141 may control the display 132 so as to adjust a screen color depending on color information matching a sound. For example, when music corresponds to a quiet sound source, the processor 141 may provide the display 132 with yellow and purple colors as color information; when the music corresponds to a relaxation sound source, the processor 141 may provide the display 132 with green, indigo, and blue colors as color information; and, when the music corresponds to a healing sound source, the processor 141 may provide the display 132 with orange and red colors as color information. When a driving virtual sound is played, the processor 141 may control the display 132 so as to change a screen color to a color matching a vehicle speed.

As another example, the processor 141 may play an image matching sound and then may output the image to the display 132. For example, the processor 141 may play various aurora images depending on a sound and may output the various aurora images to the display 132.

As another example, the processor 141 may control the lighting 131 depending on a sound and driving type. For example, the processor 141 may change colors of crush pad lighting, center console lighting, and door trim lighting depending on a sound bit and/or driving type. At this time, the crush pad lighting, the center console lighting, and the door trim lighting may be adjusted with different colors and brightness.

The processor 141 may determine emotion by analyzing emotion valence, emotion arousal, and emotion sensitivity based on the sound. The processor 141 may classify a sound into three types based on mood vectoring (an emotion analysis model). The sound type may be divided into a quiet sound source, a stable sound source, and a healing sound source. In other words, when the sound-based emotion analysis result is changed from depression or anger to happiness, the processor 141 may classify the sound type as a quiet sound source; when the sound-based emotion analysis result is changed from melancholy to calm, the processor 141 may classify the sound type as a stable sound source; and, when the sound-based emotion analysis result is changed from anger to calm, the processor 141 may classify the sound type as a healing sound source.

The processor 141 may determine a driving pattern by analyzing the opening degree of an accelerator pedal when providing a sound-based olfactory experience. The processor 141 may determine fragrance diffusion timing based on the determined driving pattern.

Moreover, when providing a sound-based visual experience, the processor 141 may determine the driving environment, for example, daytime, nighttime, tunnel, clear weather, and traffic flow, through the analysis of the illumination around the vehicle. The processor 141 may provide a visual experience by adjusting visual substitution according to the determined driving environment.

Figure 2:
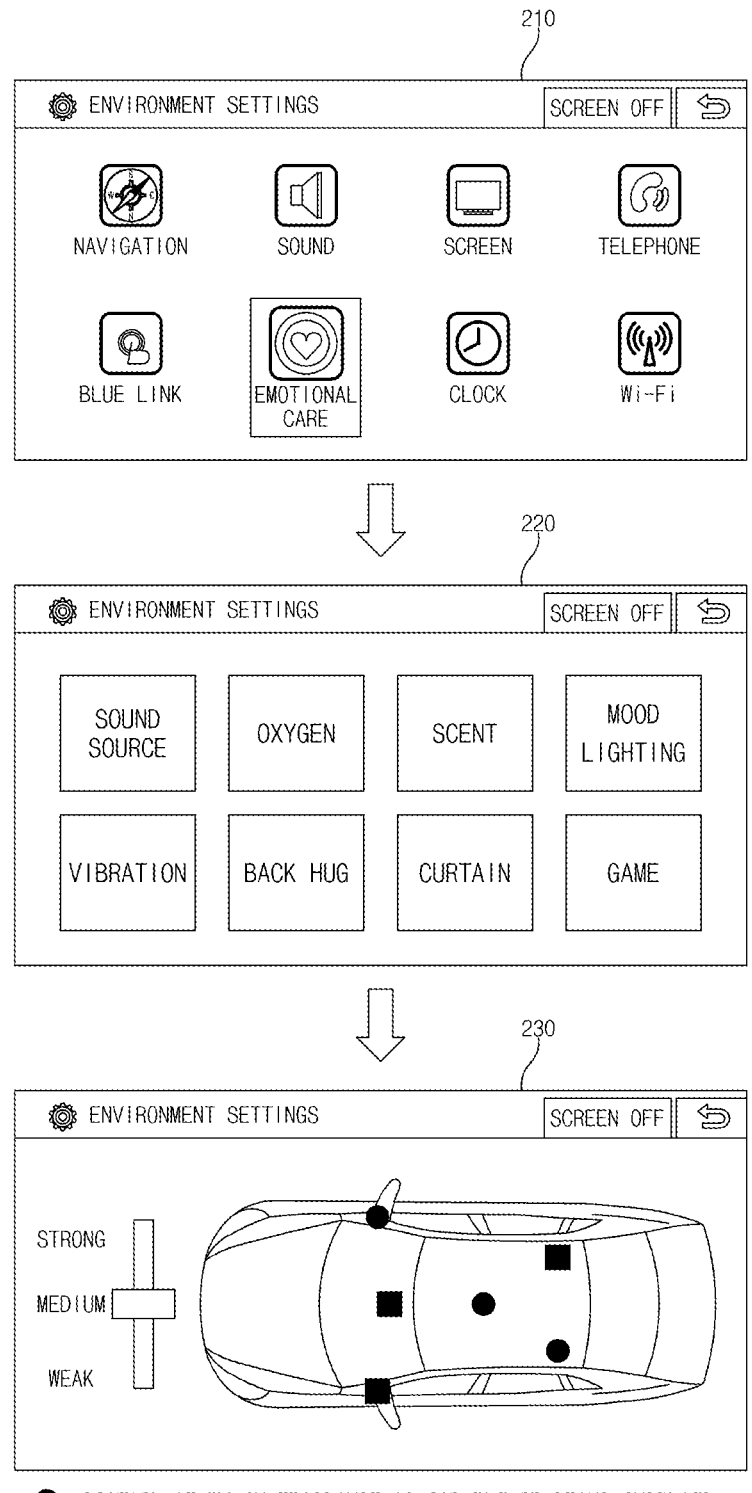
FIG. 2 is a diagram for describing a process of setting an emotional care function, according to embodiments of the present disclosure.

FIG. 2 is a diagram for describing a process of setting an emotional care function, according to embodiments of the present disclosure.

The controller 140 may be configured to output an environment setting screen 210 to the display 132 depending on a user input. When an emotional care item is selected in the environment setting screen 210, the controller 140 may be configured to display an emotional care setting screen 220 on the display 132. When a fragrance item is selected from the emotional care setting screen 220, the controller 140 may be configured to output the fragrance setting screen 230 to the display 132. The fragrance setting screen 230 may include a location at which a fragrance is capable of being supplied, a location at which oxygen is capable of being supplied, and a fragrance supply strength adjustment bar. The controller 140 may be configured to set fragrance supply strength to strong, medium, or weak strength depending on the manipulation of the fragrance supply strength adjustment bar. The controller 140 may be configured to set a location, which is selected by a user, from among locations at which a fragrance is capable of being supplied, as a fragrance diffusion location. Moreover, the controller 140 may be configured to set a location, which is selected by the user, from among locations at which oxygen is capable of being supplied, as an oxygen supply location.

Figure 3:
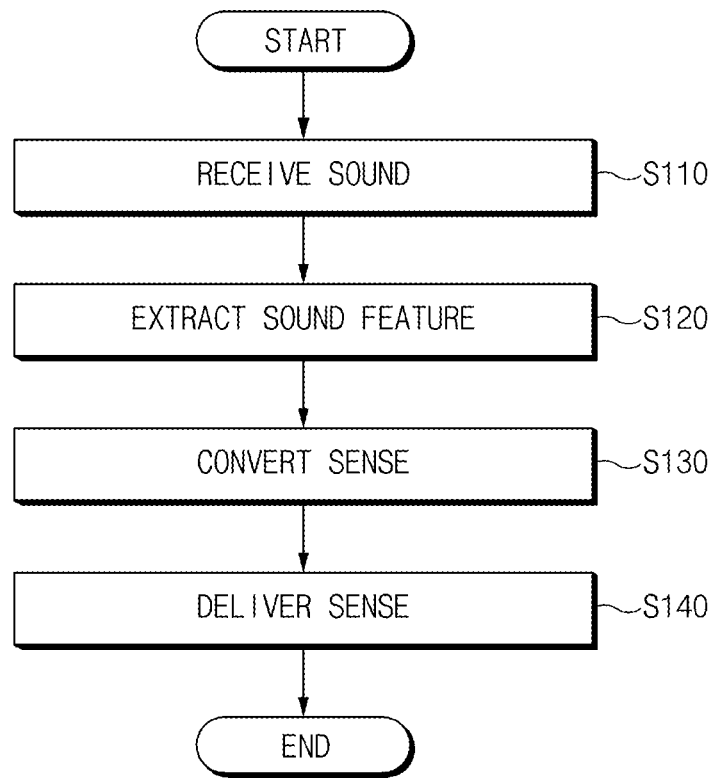
FIG. 3 is a view for describing a sensory substitution process, according to embodiments of the present disclosure.

FIG. 3 is a view for describing a sensory substitution process, according to embodiments of the present disclosure.

The controller 140 may be configured to receive a sound generated by a vehicle in S110. Through the sound detector 110, the controller 140 may be configured to receive (detect) a sound played by a media playback device (not shown) or a sound generated by a sound generating device (not shown). The controller 140 may be also configured to receive feedback on a sound output from a speaker by using a microphone or the like.

The controller 140 may be configured to extract a sound feature from the received sound in S120. The sound feature may include sound strength (amplitude), sound pitch (frequency), and/or sound tone (sound wave pattern). The controller 140 may be configured to classify (determine) a sound type based on the extracted sound feature. For example, the controller 140 may be configured to determine whether the played sound is a quiet sound source, a stable sound source, or a healing sound source, by analyzing the extracted sound feature.

The controller 140 may be configured to convert the received sound into sensory information based on the extracted sound feature in S130. In other words, the controller 140 may be configured to generate the sensory information matching the classified sound type. For example, when the received sound is a quiet sound source, a stable sound source, and/or a healing sound source, the controller 140 may be configured to match a stable floral and/or aromatic fragrance with the received sound. Besides, when the received sound is a quiet sound source, a stable sound source, and/or a healing sound source, the controller 140 may be configured to select a lighting color, lighting brightness (illuminance), and/or display image, which corresponds to the received sound.

The controller 140 may be configured to deliver a sense based on the converted sensory information in S140. For example, the controller 140 may be configured to control the fragrance generator 122 so as to adjust the scent of *gardenia* capable of giving a sense of stability and/or the scent of lavender capable of relieving stress. As another example, the controller 140 may be configured to control the lighting 131 so as to adjust a mood lighting color.

Figure 4:
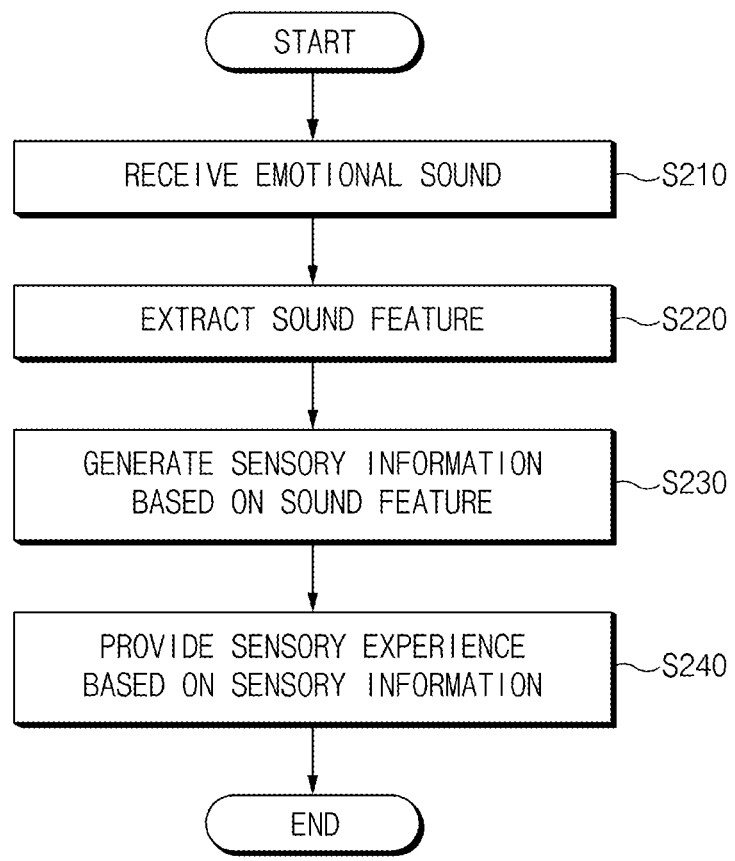
FIG. 4 is a flowchart illustrating a sensory experience providing method, according to a first embodiment of the present disclosure.

FIG. 4 is a flowchart illustrating a sensory experience providing method, according to a first embodiment of the present disclosure.

The controller 140 may be configured to receive an emotional sound played in the vehicle in S210. The sound detector 110 may directly receive an emotional sound played by a media playback device (not shown) or may detect an emotional sound, which is output to the outside through a speaker, by using a microphone or the like. The sound detector 110 may transmit the detected emotional sound to the controller 140. The controller 140 may be configured to receive an emotional sound transmitted from the sound detector 110.

The controller 140 may be configured to extract a sound feature from the emotional sound in S220. The controller 140 may be configured to extract the sound feature by using a feature extraction algorithm stored in the memory 142. The sound feature may include the amplitude, frequency, and/or tone of the sound.

The controller 140 may be configured to generate sensory information based on the extracted sound feature in S230. The controller 140 may be configured to determine the emotional state by analyzing the extracted sound feature. The controller 140 may be configured to classify the played emotional sound depending on the emotional state. That is, the controller 140 may be configured to classify (determine) a sound type (sound source type) of the emotional sound. The controller 140 may be configured to generate the sensory information matching the classified sound type. For example, when the played emotional sound is classified as a healing sound source, the controller 140 may be configured to generate olfactory information and visual information, which match the healing sound source. The olfactory information may include a fragrance type, a fragrance concentration, a fragrance diffusion location, a fragrance diffusion pattern, and/or a fragrance diffusion time. The olfactory information may include an oxygen supply location, an oxygen supply amount, and/or an oxygen supply pattern. The visual information may include a visual information type, alighting color, lighting brightness, alighting pattern, alighting location, and/or an image type.

The controller 140 may be configured to provide a sensory experience based on sensory information in S240. The controller 140 may be configured to control the operation of the olfactory transmitter 120 and/or the visual transmitter 130 based on the sensory information. The controller 140 may be configured to adjust an oxygen supply through the oxygen generator 121 and may control the fragrance generator 122 so as to adjust fragrance diffusion. The controller 140 may be configured to adjust the color, brightness, and/or flickering pattern of the lighting 131, and may control the screen color and/or displayed image of the display 132.

Figure 5:
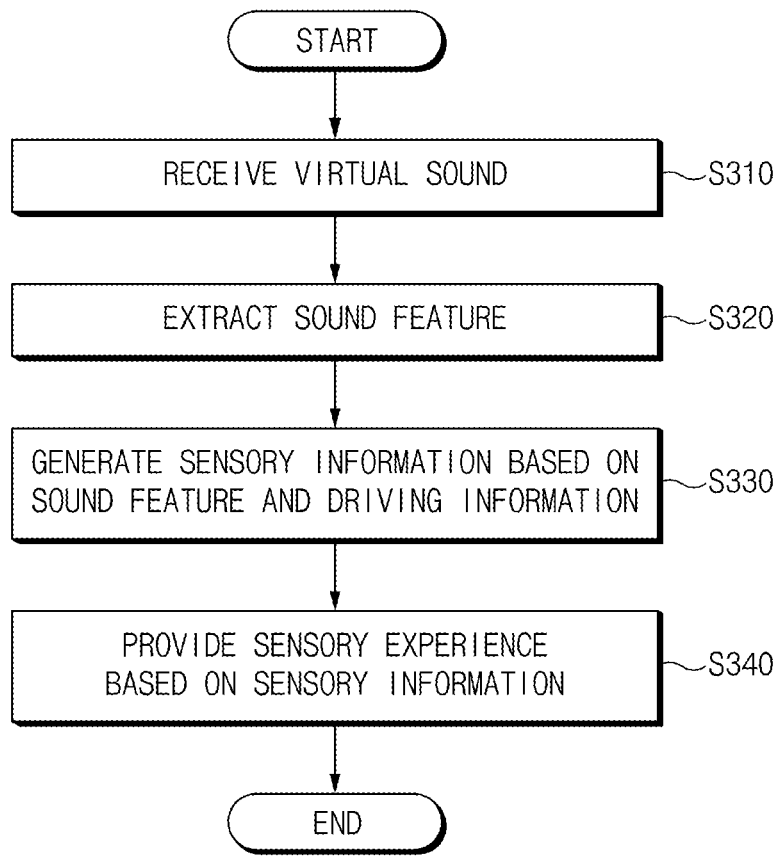
FIG. 5 is a flowchart illustrating a sensory experience providing method, according to a second embodiment of the present disclosure.

FIG. 5 is a flowchart illustrating a sensory experience providing method, according to a second embodiment of the present disclosure.

The controller 140 may be configured to receive a virtual sound generated by a vehicle in S310. The controller 140 may be configured to receive the virtual sound detected by the sound detector 110. The sound detector 110 may detect at least one of virtual sounds such as an acceleration sound, a cornering sound, and/or a driving sound played by a sound generating device. The sound detector 110 may transmit the detected virtual sound to the controller 140. The controller 140 may be configured to receive a virtual sound transmitted by the sound detector 110.

The controller 140 may be configured to extract a sound feature from the virtual sound in S320. The sound feature may include the amplitude, frequency, and/or tone of the sound.

The controller 140 may be configured to generate sensory information based on the sound feature and driving information in S330. The controller 140 may be configured to determine a sound type of the virtual sound by analyzing the extracted sound feature. Furthermore, the controller 140 may be configured to obtain driving information by using other electronic control units (ECUs) and/or sensors in the vehicle. The driving information may include a vehicle status (e.g., stop, driving, and the like), a vehicle speed, and a driving type (e.g., constant speed, acceleration, and the like). The controller 140 may be configured to generate sensory information (i.e., information for controlling operations of the olfactory transmitter 120 and/or the visual transmitter 130) for implementing a sensory experience based on a sound feature and/or driving information.

The controller 140 may be configured to provide a sensory experience based on sensory information in S340. The controller 140 may be configured to control the operation of the olfactory transmitter 120 and/or the visual transmitter 130 based on the sensory information. The olfactory transmitter 120 may adjust the supply of oxygen and/or fragrance under the control of the controller 140. On the basis of the instruction of the controller 140, the visual transmitter 130 may control an operation of the lighting 131 and may control a screen color of the display 132 and an image displayed on the display 132.

Figure 6:
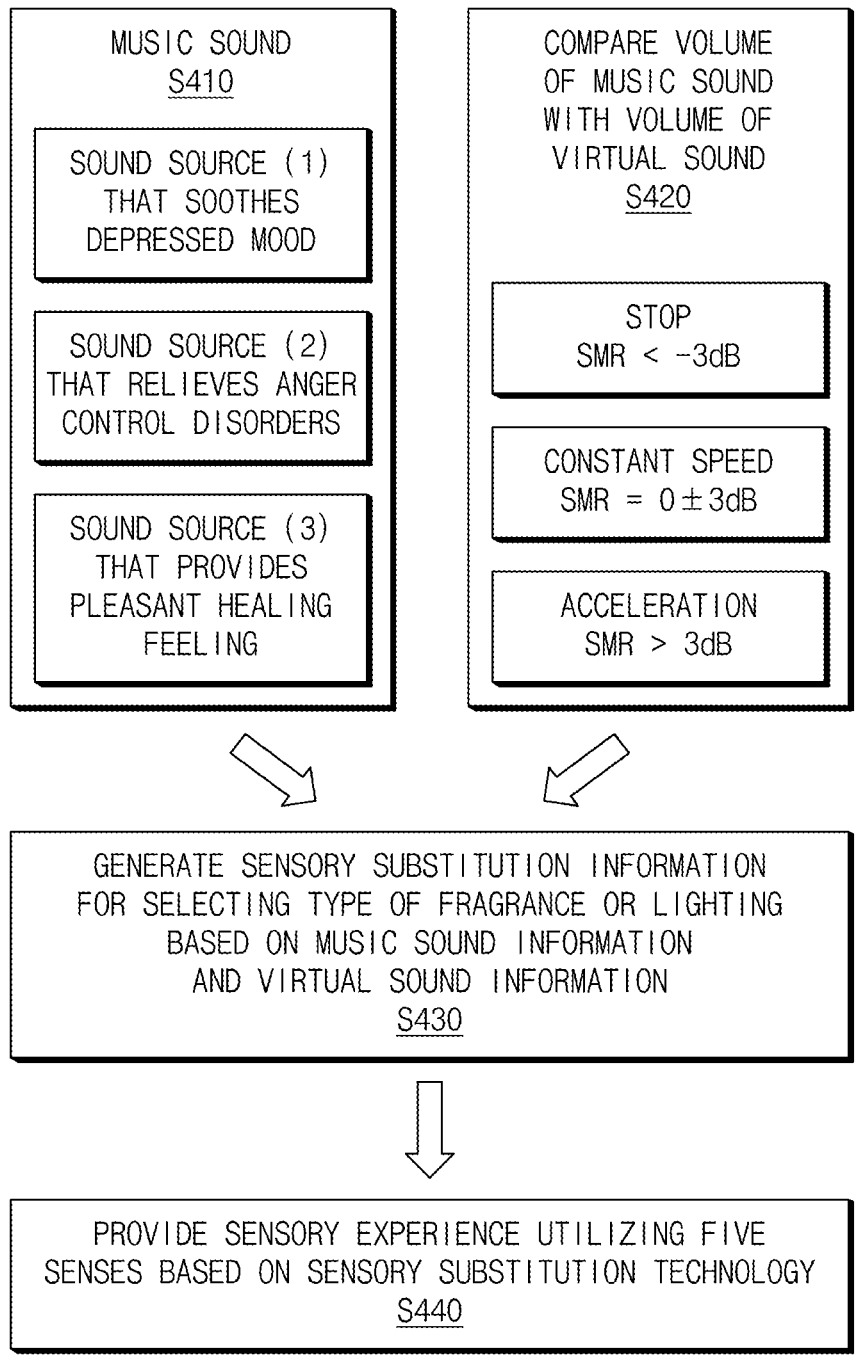
FIG. 6 is a flowchart illustrating a sensory experience providing method, according to a third embodiment of the present disclosure.

FIG. 6 is a flowchart illustrating a sensory experience providing method, according to a third embodiment of the present disclosure.

The controller 140 may be configured to receive a sound played in a vehicle. The controller 140 may be configured to separate the received sound into a music sound and a virtual sound.

The controller 140 may be configured to determine a sound source style (a sound type) of the separated music sound in S410. The sound source style may be classified into a sound source that soothes depressed mood, a sound source that relieves anger control disorders, a sound source that provides a pleasant healing feeling.

The controller 140 may be configured to compare and analyze the volume of the separated music sound with the volume of the virtual sound in S420. The controller 140 may be configured to calculate a sound-to-music ratio (SMR) of the music sound and the virtual sound by using Equation 1.

$$SMR = 20\log_{10}\left(\frac{A_{sound}}{A_{music}}\right) \quad \text{[Equation 1]}$$

Here, $A_{sound}$ denotes the volume of a virtual sound; and $A_{music}$ denotes the volume of a music sound.

The controller 140 may be configured to determine a vehicle status as stop, low speed, constant speed, or acceleration based on the calculated SMR For example, when the SMR is less than −3 dB, the controller 140 may be configured to determine that the vehicle is highly likely to be in a stop state and/or low-speed state. When the SMR is 0±3 dB, the controller 140 may be configured to determine that the vehicle is highly likely to be in a constant speed state. When the SMR exceeds 3 dB, the controller 140 may be configured to determine that the vehicle is highly likely to be in an accelerated state.

The controller 140 may be configured to generate sensory substitution information for selecting a type of a fragrance or lighting based on the music sound information and virtual sound information in S430. The controller 140 may be configured to generate excitation pattern information of the scent or lighting based on the determined music style and the volume comparison result.

The controller 140 may be configured to provide a sensory experience utilizing five senses based on the sensory substitution technology in S440. The controller 140 may be configured to control the operation of the olfactory transmitter 120 and/or the visual transmitter 130 based on the generated excitation pattern information. The olfactory transmitter 120 may adjust the supply of oxygen and/or fragrance under the control of the controller 140. On the basis of the instruction of the controller 140, the visual transmitter 130 may control an operation of the lighting 131 and may control a screen color of the display 132 and an image displayed on the display 132.

Figure 7:
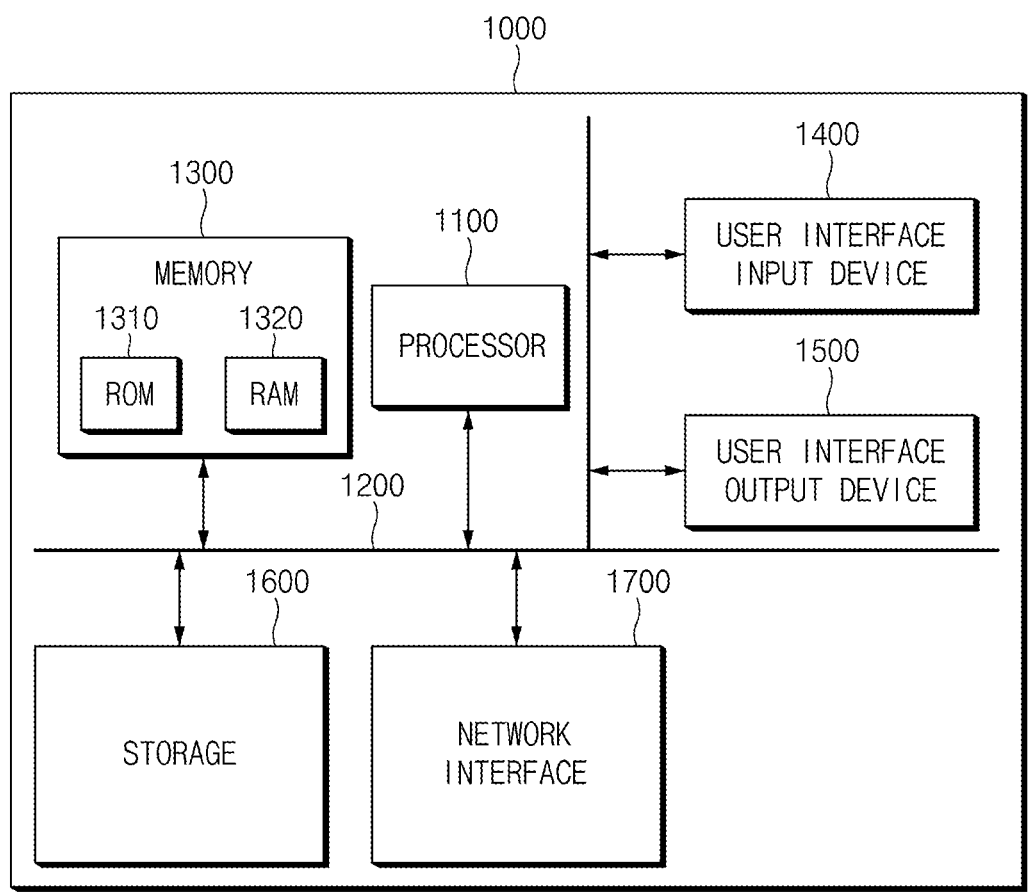
FIG. 7 is a block diagram illustrating a computing system performing a sensory experience providing method, according to an exemplary embodiment of the present disclosure.

FIG. 7 is a block diagram illustrating a computing system performing a sensory experience providing method, according to an exemplary embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor 1100 and storage medium may be implemented with an application specific integrated circuit (ASIC). The ASIC may be provided in a user terminal. Alternatively, the processor 1100 and storage medium may be implemented with separate components in the user terminal.

The above description is merely an example of the technical idea of embodiments of the present disclosure, and various modifications and modifications may be made by one skilled in the art without departing from the essential characteristic of embodiments of the present disclosure. Therefore, embodiments of the present disclosure are not intended to limit the technical spirit of embodiments of the present disclosure but provided only for the illustrative purpose. The scope of protection of embodiments of the present disclosure should be construed by the attached claims, and all equivalents thereof should be construed as being included within the scope of embodiments of the present disclosure.

According to an exemplary embodiment of the present disclosure, sensory information such as olfactory information and/or visual information is generated based on the sound generated by a vehicle, thereby providing a user with emotional care using a sensory experience.

Hereinabove, although embodiments of the present disclosure have been described with reference to exemplary embodiments and the accompanying drawings, embodiments of the present disclosure are not limited thereto, but may be variously modified and altered by those skilled in the art to which embodiments of the present disclosure pertain without departing from the spirit and scope of embodiments of the present disclosure claimed in the following claims.

What is claimed is:

1. A method for providing a sensory experience, the method comprising:
   receiving, by a controller, a sound played in a vehicle;
   extracting, by the controller, a sound feature from the received sound;
   generating, by the controller, sensory information based on the extracted sound feature; and
   providing, by the controller, a sensory experience based on the sensory information;
   wherein the generating of the sensory information comprises;
      separating the received sound into a music sound and a virtual sound;
      determining a sound source style of the music sound,
      comparing and analyzing a volume of the music sound with a volume of the virtual sound; and
      generating the sensory information based on the sound source style and the volume comparison result.

2. The method of claim 1, wherein the receiving of the sound comprises:
   receiving, by the controller, at least one of an acceleration sound or a cornering sound.

3. The method of claim 1, wherein the extracting of the sound feature comprises:
   extracting, by the controller, at least one of a sound amplitude, a sound frequency, or a sound tone from the received sound.

4. The method of claim 1, wherein the generating of the sensory information comprises:
   classifying, by the controller, a sound type by analyzing the extracted sound feature; and
   generating, by the controller, at least one of olfactory information or visual information, which matches the classified sound type.

5. The method of claim 4, wherein the olfactory information comprises at least one of a fragrance type, a fragrance concentration, a fragrance diffusion location, a fragrance diffusion pattern, or a fragrance diffusion time.

6. The method of claim 5, wherein the olfactory information further comprises at least one of an oxygen supply location, an oxygen supply amount, or an oxygen supply pattern.

7. The method of claim 4, wherein the visual information comprises at least one of a visual information type, a lighting color, lighting brightness, a lighting pattern, an image type, or a color change order according to a vehicle speed.

8. The method of claim 1, wherein the providing of the sensory experience comprises:
   adjusting, by the controller, an oxygen supply of an oxygen generator based on the sensory information; and
   adjusting, by the controller, fragrance diffusion of a fragrance generator based on the sensory information.

9. The method of claim 1, wherein the providing of the sensory experience comprises:
   controlling, by the controller, an operation of a lighting based on the sensory information; and
   outputting, by the controller, an output of a display based on the sensory information.

10. A sensory experience providing apparatus, the apparatus comprising a controller mounted in a vehicle, wherein the controller is configured to:
    receive a sound played in the vehicle;
    extract a sound feature from the received sound;
    generate sensory information based on the extracted sound feature; and
    provide a sensory experience based on the sensory information;
    wherein the controller is further configured to:
       separate the received sound into a music sound and a virtual sound;
       determine a sound source style of the music sound;
       compare and analyze a volume of the music sound with a volume of the virtual sound, and
       generate the sensory information based on the sound source style and the volume comparison result.

11. The apparatus of claim 10, wherein the sound is at least one of an acceleration sound or a cornering sound.

12. The apparatus of claim 10, wherein the sound feature comprises at least one of a sound amplitude, a sound frequency, or a sound tone.

13. The apparatus of claim 10, wherein the controller is further configured to:
    classify a sound type by analyzing the extracted sound feature; and
    generate at least one of olfactory information or visual information, which matches the classified sound type.

14. The apparatus of claim 13, wherein the olfactory information comprises at least one of a fragrance type, a fragrance concentration, a fragrance diffusion location, a fragrance diffusion pattern, or a fragrance diffusion time.

15. The apparatus of claim 14, wherein the olfactory information comprises at least one of an oxygen supply location, an oxygen supply amount, or an oxygen supply pattern.

16. The apparatus of claim 13, wherein the visual information comprises at least one of a visual information type, a lighting color, lighting brightness, a lighting pattern, an image type, or a color change order according to a vehicle speed.

17. The apparatus of claim 10, further comprising:
   an oxygen generator configured to supply oxygen; and
   a fragrance generator configured to supply a fragrance.

18. The apparatus of claim 17, wherein the controller is further configured to:
   adjust an oxygen supply of the oxygen generator based on the sensory information; and
   adjust fragrance diffusion of the fragrance generator based on the sensory information.

19. The apparatus of claim 10, further comprising:
   a lighting; and
   a display,
   wherein the controller is further configured to:
      control an operation of the lighting based on the sensory information; and
      control an output of the display based on the sensory information.

* * * * *